United States Patent [19]
Goto

[11] 4,071,001
[45] Jan. 31, 1978

[54] STRATIFIED COMBUSTION ENGINE WITH PRECHAMBER

[75] Inventor: Kenji Goto, Shizuoka, Japan

[73] Assignee: Toyota Jidosha Kogyo Kabushiki Kaisha, Toyota, Japan

[21] Appl. No.: 581,528

[22] Filed: May 28, 1975

[30] Foreign Application Priority Data
Oct. 3, 1974 Japan .................. 49-37170

[51] Int. Cl.$^2$ .............................. F02B 19/10
[52] U.S. Cl. .............. 123/75 B; 123/191 S; 123/191 SP
[58] Field of Search .......... 123/32 ST, 32 SP, 32 SA, 123/32 K, 32 L, 32 AA, 75 B, 169 EL, 169 PH, 191 S, 191 SP, 143 B

[56] References Cited

U.S. PATENT DOCUMENTS

| | | | |
|---|---|---|---|
| 1,354,924 | 10/1920 | Sublette | 123/169 EL |
| 2,316,794 | 4/1943 | Johnson | 123/32 L |
| 2,677,356 | 5/1954 | Pielstick | 123/32 K |
| 2,799,257 | 7/1957 | Stumpfig et al. | 123/32 SP |
| 2,932,289 | 4/1960 | Witzky | 123/32 A |
| 3,283,751 | 11/1966 | Goossak et al. | 123/32 ST |
| 3,382,850 | 5/1968 | Baudry et al. | 123/75 B X |
| 3,926,158 | 12/1975 | Dolza, Sr. | 123/75 B |
| 3,955,538 | 5/1976 | Noguchi et al. | 123/75 B X |
| 3,980,060 | 9/1976 | Noguchi et al. | 123/75 B X |

FOREIGN PATENT DOCUMENTS

2,402,412  7/1974  Germany .................. 123/32 ST

*Primary Examiner*—Charles J. Myhre
*Assistant Examiner*—Tony M. Argenbright
*Attorney, Agent, or Firm*—Pollock, Vande Sande & Priddy

[57] ABSTRACT

A stratified combustion engine provided with a prechamber having no inlet valve associated therewith, wherein the precombustion chamber comprises a first chamber communicating with a main combustion chamber, a second chamber communicating with the first chamber only through an orifice, and a discharge electrode disposed in the orifice. In the suction stroke, a lean fuel-air mixture is charged into the main combustion chamber, while a stream of a rich fuel-air mixture, which is deflected in the direction of flow by impinging against the back face of an inlet valve, is introduced into the first chamber from the main combustion chamber through a communication passage, so that the so-called stratified charge can be achieved. In the compression stroke, the rich fuel-air mixture is charged from the first chamber into the second chamber through the orifice. In the combustion process, the rich fuel-air mixture existing in the orifice is ignited and the fuel-air mixture in the first chamber is burnt by the flame emerging continuously from the second chamber through the orifice so that the lean fuel-air mixture in the main combustion chamber can be burnt by the flame of the rich mixture burning in the first chamber.

9 Claims, 1 Drawing Figure

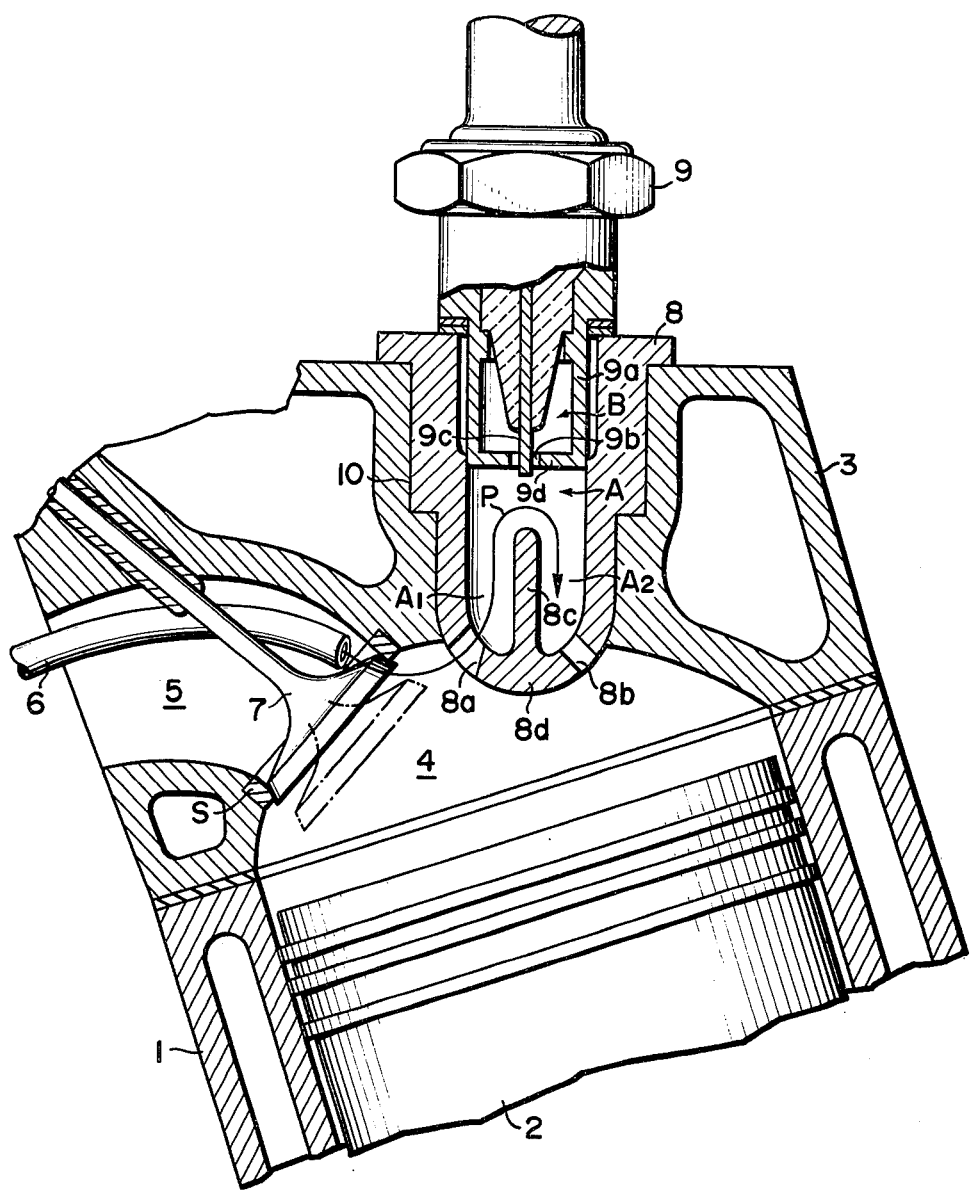

STRATIFIED COMBUSTION ENGINE WITH PRECHAMBER

BACKGROUND OF THE INVENTION

This invention relates to an internal combustion engine of the stratified combustion type provided with a pre-combustion chamber which ensures effective combustion of a lean fuel-air mixture.

It is known that the most effective method of reducing the amounts of carbon monoxide (CO), unburnt hydrocarbons (HC) and nitrogen oxides (NOx) contained in exhaust gases discharged from internal combustion engines is to burn a fuel-air mixture which is as lean as possible. However, it is necessary to overcome various difficulties as pointed out below in order that a very lean mixture having a large air-fuel ratio of, for example, 20 can be stably burnt within the cylinder. One of the difficulties encountered in the combustion of a lean mixture having such a large air-fuel ratio in a known gasoline engine is that misfire tends to occur due to the fact that such a lean mixture has a very low ignitability. This ignitability is further lowered especially when residual gases produced as a result of combustion of such lean mixture remain in the vicinity of the discharge electrode of the ignition plug. Combustion of such lean mixture encounters such difficulty that the efficiency of the engine is lowered and the rate of fuel consumption is increased due to the fact that the rate of combustion of a very lean mixture is quite low.

Internal combustion engines of the stratified combustion type are known which overcome such difficulties and are capable of ensuring sustained combustion of a lean mixture without giving rise to undesirable misfire. As is already well known in the art, these stratified combustion engines are designed on the basis of a unique combustion theory. According to this theory, a rich mixture is formed in a limited zone in the vicinity of the ignition plug to be initially ignited by the spark of the ignition plug so as to provide an igniting source or touch, and this igniting source or torch is utilized to cause combustion of a lean mixture surrounding the rich fuel-air mixture. A stratified combustion engine, which is provided with a pre-combustion chamber in addition to a main combustion chamber, is known as one type of such stratified combustion engines. The manner of such combustion employed in this type of stratified combustion engine is such that a rich mixture is charged in the pre-combustion chamber to be initially ignited by the spark of the ignition plug and then this combustion flame is forced through a communication passage into the main combustion chamber with an increase in the pressure due to the combustion of the fuel-air mixture in the precombustion chamber so as to utilize this combustion flame as an igniting source or torch for causing combustion of a lean fuel-air mixture in the main combustion chamber. The communication passage extending between the precombustion chamber and the main combustion chamber in the engine of this type has a relatively small sectional area. Therefore, the burning flame is jetted from the precombustion chamber into the main combustion chamber at a considerably high speed while spreading over a wide range so that the lean mixture in the main combustion chamber can be immediately ignited by the burning flame. Further, a very strong turbulent flow is produced in the main combustion chamber by the combustion flame flowing into the main combustion chamber at high speed, and the rate of combustion is increased by the turbulence thus produced. (This effect is commonly called the "torch" effect.)

The stratified combustion engine of the type above described is relatively old and is well known in the art. Such an engine has at each cylinder a main combustion chamber, a precombustion chamber which communicates through a communication passage with the main combustion chamber, a main suction passage for supplying a lean mixture into the main combustion chamber, a rich mixture supply conduit disposed in the main suction passage, and a main inlet valve common to both the main suction passage and the rich mixture supply conduit. The engine design has as its objective the aim of reducing fuel comsumption, but it has not been put into production up to the present time because of its more complex structure as compared to that of a conventional engine and because of its disadvantages which include:

1. The rich mixture in the precombustion chamber is diluted with the lean mixture forced into the precombustion cyamber upon the compression stroke of the engine, thereby tending to misfire;
2. As charging of the rich mixture into the precombustion chamber is effected through the main combustion chamber, the rich mixture is interfered with by the lean mixture which results in poor charging efficiency for the precombustion chamber;
3. Scavenging of the burnt gas in the precombustion chamber cannot be fully effected during the suction stroke of the engine because of interference of flow of the rich mixture with the burnt gas and the lean mixture.
4. As the scavenging of burnt gas in the precombustion chamber and charging of the rich mixture into the precombustion chamber is effected through only one communication passage, interference of the burnt gas with the rich mixture occurs. This also leads to poor charging efficiency for the precombustion chamber and to misfire.
5. When the spark electrode is disposed in the vicinity of a communication passage which provides communication between the precombustion chamber and the main combustion chamber, the mixture existing in the vicinity of the spark electrode tends to be diluted with the lean mixture forced into the precombustion chamber, thus resulting in misfire. On the other hand, if the spark electrode is disposed at the innermost position in the precombustion chamber, the mixture existing remote from the spark electrode is discharged in the unignited state from the precombustion chamber by the expanding pressure of the ienited mixture existing in the vicinity of the spark electrode. This makes it impossible to obtain a sustained torch.

To eliminate these disadvantages, a modified stratified combustion engine has been developed recently and put into mass production. In such modified engine, the precombustion chamber is directly connected to a carburetor and is provided with a sub-inlet valve for the suction of the rich mixture. The main combustion chamber, on the other hand, is connected only to the main suction passage for the lean mixture supply. A main inlet valve is disposed in the main suction passge, and the rich mixture supply conduit is eliminated.

In this modified stratified combustion engine, the sub-inlet valve is opened at the end of the compression stroke of the engine (that is, immediately before ignition); therefore, it is possible to prevent dilution of the rich mixture with the lean misture. In addition, scavenging of burnt gas in the precombustion chamber can be fully effected because of a lack of interference of rich mixture charging flow with lean mixture in the main combustion chamber during the suction stroke of the engine.

Such modified stratified combustion engine is substantially effective for achieving stable combustion of an extremely lean mixture, but, on the other hand, it has the disadvantage that a complex valve mechanism and a cylinder head having a complex structure are required.

In addition, the modified stratified combustion engine includes the disadvantage (5) set forth above.

A further modification of the engine of the modified type has also been proposed, in which the sub-inlet valve provided in the precombustion chamber is substituted for a fuel injection valve. This further modified engine, however, also has the disadvantage that the structure of the fuel supplying system is complex and the manufacturing cost is also considerably increased due to the fact that a special controller is required for accurately controlling the quantity of fuel to be injected and fuel injection timing.

There is, therefore, a considerable demand for a further improved stratified combustion engine of simple construction.

SUMMARY OF THE INVENTION

The present inventor has invented an effective solution for the above-mentioned problem in the course of strenuous studies and research on a stratified combustion engine of the type in which a sub-inlet valve or the like is not required for a precombustion chamber.

It is therefore a primary object of the present invention to provide an improved stratified combustion engine in which a sub-inlet valve or the like is not provided for the precombustion chamber.

The present invention is characterized by the fact that, in a stratified combustion engine of the type provided with a precombustion chamber and in which a sub-inlet valve is not provided for the precombustion chamber, the precombustion chamber has a unique structure as described below. According to the present invention, the precombustion chamber has first and second chambers therein. The chambers are arranged in series or axially aligned with each other. The first chamber is arranged adjacent a main combustion chamber and communicates with the main combustion chamber through at least two communications passages. The second chamber is arranged behind the first chamber and remote from the main combustion chamber. The first and the second chambers are separated from each other by a partition having an orifice. The first chamber is divided into a pair of parallel spaces by a partial partition. The spaces partly communicate with each other and also communicate with a main combustion chamber through a communications passage. A discharge electrode is disposed in the orifice. The gap defined between this discharge electrode and the peripheral wall surface of the orifice serves as a spark gap, and a fuel-air mixture flowing into the first chamber from the second chamber is ignited in this spark gap by the spark from the discharge electrode.

A known poppet type inlet valve is disposed in a main suction port of the main combustion chamber, and a rich mixture supply conduit is disposed in a main suction passage connected to the main suction port of the main combustion chamber. The rich mixture supply conduit terminates in a position opposite to the back face of the inlet valve.

In the suction stroke of the piston in the engine, the inlet valve is opened to admit a lean fuel-air mixture supplied by the main suction passage into the main combustion chamber, and at the same time, a rich fuel-air mixture supplied by the rich mixture supply conduit is directed toward the back face of the inlet valve. The rich fuel-air mixture impinging against the back face of the inlet valve is deflected thereby to flow toward the top of the main combustion chamber along the back face of the inlet valve. As a result, the deflected stream of the rich fuel-air mixture flows into the first chamber through one of the communication passages extending between the main combustion chamber and the first chamber. At the same time, the rich fuel-air mixture charged into the first chamber from the main combustion chamber through one of the communication passages extending between the main combustion chamber and the first chamber acts to purge or to scavenge the residual gases remaining in the first chamber into the main combustion chamber through the other communication passage, such fuel-air mixture is charged in the first chamber. In the meantime, the lean fuel-air mixture is charged into the main combustion chamber from the main suction passage.

In the compression stroke in which the piston makes upward movement, a portion of the lean fuel-air mixture charged in the main combustion chamber is forced into the first precombustion chamber through the communication passages, and at the same time, a portion of the rich fuel-air mixture charged in the first chamber is forced into the second chamber through the orifice. At the end of the compression stroke, the rich fuel-air mixture portion existing in the spark gap is ignited by the spark generated by the discharge electrode. The flame produced by the combustion of the rich fuel-air mixture in the spark gap enters the first chamber to ignite the fuel-air mixture in the first chamber. The flame thus produced by the combustion of the fuel-air mixture in the first chamber enters the main combustion chamber through the communication passages so that this flame can be utilized as a torch for causing effective combustion of the lean fuel-air mixture charged in the main combustion chamber.

BRIEF DESCRIPTION OF THE DRAWING

The accompanying drawing is a part of the sectional view of the engine embodying the present invention.

DETAILED DESCRIPTION OF THE PRESENT INVENTION

A preferred embodiment of the present invention will be described with reference to the accompanying drawing.

Referring to the drawing, a cylinder is designated by the reference numeral 1, and a piston 2 is received for reciprocating movement in this cylinder 1. The reference numeral 3 designates a cylinder head, and a main combustion chamber 4 is formed in this cylinder head 3 opposite to the top face of the piston 2. A main suction passage 5 communicating with the intake manifold opens in the main combustion chamber 4, and a valve seat S is securely fixed in the end opening of the main suction passage 5. A rich mixture supply conduit 6 is disposed in the main suction passage 5 to terminate in a position adjacent to the valve seat S and has its end opening directed toward the back face of a poppet type inlet valve 7 which makes seating engagement with the valve seat S.

Designated by the reference numeral 8 is a pre-combustion chamber having a substantially hollow body cylindrical precombustion chamber; which projects partly into the main combustion chamber 4 and is made of a heat resistant material. Pre-combustion chamber 8 has a closed end which terminates in a position adjacent to the opening of the main suction passage 5. Pre-combustion chamber 8 has an ignition plug 9 having a discharge electrode 9c therewithin and defining a pair of chambers A and B. The first chamber A is situated nearer to the closed end of the pre-combustion chamber 8 and communicates with the main combustion chamber 4 through a pair of spaced communication passages 8a and 8b formed in the wall of the closed end of the pre-combustion chamber 8. One of these communication passages, that is, the communication passage 8a, extends through the wall of the closed end of the pre-combustion chamber 8 in such a direction that the stream of a rich fuel-air mixture supplied from the rich mixture supply conduit 6 can be easily admitted into the first chamber A. The other communication passage 8b extends through the wall of the closed end of the pre-combustion chamber 8 toward a position which is remotest from the inlet valve 7 in the main combustion chamber 4. The first chamber A is divided into a pair of spaces $A_1$ and $A_2$ by a partial partition 8c which extends from the inner wall surface of the closed end of the precombustion chamber 8 toward the second chamber parallel to the central axis of the pre-combustion chamber 8. These two spaces $A_1$ and $A_2$ communicate with the main combustion chamber 4 through the respective communication passages 8a and 8b. The two spaces $A_1$ and $A_2$ communicate with each other in the rear portion of the first chamber A since the partial partition 8c does not extend over the entire axial length of the first chamber A.

The second chamber B is connected in series with the first chamber A and is disposed rearward of the first chamber A as a continuation of the latter. This second chamber B has a volume considerably smaller than that of the first chamber A and is partitioned from the first chamber A by a partition, or a closure 9a of the ignition plug 9 fitted in the rear end opening of the pre-combustion chamber 8. The second chamber B communicates with the first chamber A through a communication passage or orifice 9b provided at the central portion of the closure 9a of the ignition plug 9. The discharge electrode 9c is disposed within the second chamber B and extends into the orifice 9b so that the gap defined between the discharge electrode 9c and the peripheral wall surface of the orifice 9b can serve as a spark gap.

In the suction stroke in which the piston 2 makes downward movement, the inlet valve 7 is urged away from seating engagement with the valve seat S to take a position as shown by the two-dot chain lines in the drawing. As a result of the movement of the inlet valve 7 to the position above described, the lean fuel-air mixture is supplied from the main suction passage 5 into the main combustion chamber 4, and at the same time, the rich fuel-air mixture is supplied from the rich mixture supply conduit 6 into the main suction passage 5. The stream of the rich fuel-air mixture supplied from the rich mixture supply conduit 6 is deflected by impinging against the back face of the inlet valve 7 flows toward the first communication passage 8a. The rich fuel-air mixture flows then into the first chamber A through the communication passage 8a in the pre-combustion chamber 8 along a path P as shown in the drawing. It will be unnecessary to make any especial explanation as to the fact that the rich fuel-air mixture is directed from the rich mixture supply conduit 6 toward the back face of the inlet valve 7.

The rich fuel-air mixture introduced from the main combustion chamber 4 into one of the spaces, or the space $A_1$, of the first chamber A through the communication passage 8a flows upward in the first chamber A along the path P, and after the flowing direction thereof is reversed at the innermost zone of the chamber A at which the space $A_1$ communicates with the space $A_2$, the rich fuel-air mixture flows downward in the space $A_2$ toward the communication passage 8b by being guided by the partition 8c. Therefore, the residual gases produced by combustion in the preceding combustion stroke and remaining thereafter in the first chamber A are scavenged from within the first chamber A by this stream of the rich fuel-air mixture into the main combustion chamber 4 through the communication passage 8b. In the meantime a fresh supply of the rich mixture is charged into the first chamber A. Further, within this period of time, a fresh supply of the lean mixture is charged into the main combustion chamber 4 from the main suction passage 5. Thus, the rich mixture is charged in the pre-combustion chamber 8 having the ignition plug 9 combined therewith, and the lean mixture is charged in the main combustion chamber 4 which is not provided with any ignition plug, so that the state of the so-called stratified charge can be established in the engine.

In the compression stroke in which the piston 2 makes upward movement, the inlet valve 7 is brought into seating engagement with the valve seat S to shut off the supply of the fuel-air mixtures into the main and precombustion chambers. The lean mixture charged in the main combustion chamber 4 is compressed with the upward movement of the piston 2, and a portion of the lean mixture is forced into the first chamber A in the pre-combustion chamber 8 through the communication passages 8a and 8b. As a result, a portion of the rich mixture having been charged in the first chamber A is forced into the second chamber B through the orifice 9b. However, due to the fact that the volume of the second chamber B is sufficiently smaller than that of the first chamber A as described previously, the second chamber B is immediately filled with the rich mixture, and at the same time, a portion of the rich mixture stays also in the zone of the first chamber A in the vicinity of the orifice 9b.

Immediately before the piston 2 reaches the upper dead point, a spark jumps from the discharge electrode 9c of the ignition plug 9 toward the peripheral wall surface of the orifice 9b to ignite the rich mixture existing in the spark gap defined between the discharge electrode 9c and the peripheral wall surface of the orifice 9b. The flame produced by the combustion of the rich mixture existing in the orifice 9c propagates to the second chamber B to ignite the fuel-air mixture charged in the second chamber B. In this state, the internal pressure of the second chamber B is increased as a result of the combustion of the fuel-air mixture existing in the spark gap. However, due to the presence of the partition or closure 9a the mixture remaining in the first chamber would not be discharged at a time into the main combustion chamber 4 through the passages 8a and 8b. That is, the flame produced by the combustion of the rich fuel-air mixture in the second chamber discharges continuously into the first chamber A through the orifice 9b, and this flame acts as a torch for igniting the fuel-air mixture existing in the first chamber A. In this state, the flame entering the first chamber A from the second chamber B through the orifice 9b is directed to impinge against the peripheral wall surface portions of the first chamber A adjacent to the communication passages 8a and 8b.

The flame produced by the combustion of the mixture in the first chamber A enters the main combustion chamber 4 through the communication passages 8a and 8b and acts as a torch to ignite the lean mixture charged in the main combustion chamber 4. In this state, combustion of the mixture in the first chamber A takes place in the zones in the vicinity of the communication passages 8a and 8b as above described. Thus, all the unburnt mixture in the first chamber A would not be discharged into the main combustion chamber 4 at a time, but the flame produced by the combustion of the fuel-air mixture in the first chamber enters continuously into the main combustion chamber 4 from the first chamber A, with the result that stable and sustained combustion of the lean mixture charged in the main combustion chamber 4 can be reliably achieved.

It will be understood from the foregoing detailed description of the present invention that stable and sustained combustion of a lean fuel-air mixture can be reliably achieved in an engine of simple construction which eliminates the need for provision of a sub-inlet valve for a pre-combustion chamber.

What is claimed is:

1. In an improved stratified combustion engine of the type including a main combustion chamber defined by a cylinder head and a piston head, a main suction passage supplying a lean mixture into the main combustion chamber, a precombustion chamber having a discharge electrode therein and communicating with the main combustion chamber, a supply conduit in the main suction passage for directing a rich mixture to the precombustion chamber through the main combustion chamber, and an inlet valve common to the main suction passage and to the supply conduit, the improvement comprising:

a first chamber formed in the precombustion chamber,
   a first passage communicating said first chamber with said main combustion chamber for introducing a flow of the rich mixture deflected from the back face of the inlet valve into said first chamber upon opening of said inlet valve,
   a second passage communicating said first chamber with the main combustion chamber for scavenging a burnt gas retained in said first chamber into a portion of the main chamber remote from said inlet valve upon opening of the inlet valve,
   a second chamber arranged in the precombustion chamber in axial alignment with said first chamber,
   a partition dividing said first chamber from said second chamber,
   an orifice formed in said partition and communicating said first chamber with said second chamber, said orifice being of sufficient size to permit at least a portion of the fuel-air mixture in said first chamber to be transferred to said second chamber during the compression state of the piston, and
   said discharge electrode being disposed in said second chamber and extending into said orifice.

2. The stratified combustion engine according to claim 1, wherein said first chamber is divided into a pair of spaces communicating with each other and with the main combustion chamber through said first and second passages respectively.

3. The stratified combustion engine according to claim 1 wherein said first chamber is partially divided into a pair of spaces by a partial partition extending parallel to the axis of the precombustion chamber from the end thereof closest to said main combustion chamber toward said partition.

4. The stratified combustion engine according to claim 1 wherein said second chamber has a volume smaller than that of said first chamber.

5. The stratified combustion engine according to claim 1 wherein said partition comprises a portion of a closure means of the ignition plug.

6. The stratified combustion engine according to claim 5 wherein said precombustion chamber comprises a spark gap formed between an inner wall of said portion which defines said orifice and said discharge electrode of the ignition plug.

7. The stratified combustion engine according to claim 1 wherein said precombustion chamber comprises an ignition plug having said discharge electrode therein and incorporated in said precombustion chamber, said second chamber being defined at least in part by closure means for said ignition plug, said orifice formed in said closure means, and a spark gap formed between an inner wall of said orifice and said discharge electrode of said ignition plug.

8. The stratified combustion engine according to claim 1 wherein said first communicating passage is at least one in number and is directional in axial alignment with a stream of rich mixture deflected from the back face of the inlet valve.

9. The stratified combustion engine according to claim 1 wherein said first passage is directed in axial alignment with a stream of rich mixture deflected from the back face of the inlet valve, and said second passage is directed opposite to said first passage relative to the axis of said precombustion chamber, said second passage permitting the scavenging of burnt gas remaining in said precombustion chamber into the main combustion chamber.

* * * * *